US012752259B2

(12) United States Patent
Elbashir et al.

(10) Patent No.: US 12,752,259 B2
(45) Date of Patent: Oct. 6, 2026

(54) CATALYSTS FOR CARGEN, METHODS OF PREPARING, AND USES OF SAME

(71) Applicant: Qatar Foundation for Education, Science and Community Development, Doha (QA)

(72) Inventors: Nimir O. Elbashir, Doha (QA); Mohamedsufiyan Azizurrehman Challiwala, Doha (QA); Hanif Ahmed Choudhury, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 588 days.

(21) Appl. No.: 17/786,897

(22) PCT Filed: Oct. 9, 2020

(86) PCT No.: PCT/QA2020/050012
§ 371 (c)(1),
(2) Date: Jun. 17, 2022

(87) PCT Pub. No.: WO2021/125990
PCT Pub. Date: Jun. 24, 2021

(65) Prior Publication Data

US 2023/0039945 A1 Feb. 9, 2023

Related U.S. Application Data

(60) Provisional application No. 62/949,133, filed on Dec. 17, 2019.

(51) Int. Cl.
*B01J 23/755* (2006.01)
*B01J 21/04* (2006.01)
(Continued)

(52) U.S. Cl.
CPC ............ *B01J 23/755* (2013.01); *B01J 21/04* (2013.01); *B01J 35/397* (2024.01); *B01J 35/40* (2024.01);
(Continued)

(58) Field of Classification Search
None
See application file for complete search history.

(56) References Cited

U.S. PATENT DOCUMENTS 9,751,079 B2 * 9/2017 Freer ........................ B01J 37/08
2005/0002856 A1 1/2005 Zaluska
(Continued)

FOREIGN PATENT DOCUMENTS

CN 104302575 A 1/2015
CN 107108206 A 8/2017
(Continued)

OTHER PUBLICATIONS

Kim et al., "Synthesis and growth of boron nitride nanotubes by a ball milling-annealing process", Acta Materialia 59 (2011) 2807-2813 (Year: 2011).*
(Continued)

*Primary Examiner* — Coris Fung
(74) *Attorney, Agent, or Firm* — K&L Gates LLP

(57) ABSTRACT

Disclosed is high conversion and high carbon yielding CARGEN catalyst and a method of preparing the same. The catalyst comprises transition metals that may be supported or unsupported. The preparation method involves mixing a metal material with or without a support in a standard ball milling apparatus to produce a fine and homogenous solid mixture of the transition metal oxide and support. The catalyst is used in the CARGEN system.

6 Claims, 5 Drawing Sheets

(51) Int. Cl.

| | |
|---|---|
| ***B01J 35/30*** | (2024.01) |
| ***B01J 35/40*** | (2024.01) |
| ***B01J 35/45*** | (2024.01) |
| ***B01J 35/61*** | (2024.01) |
| ***B01J 35/63*** | (2024.01) |
| ***B01J 35/70*** | (2024.01) |
| ***B01J 35/77*** | (2024.01) |
| ***B01J 37/00*** | (2006.01) |
| ***B01J 37/18*** | (2006.01) |
| ***C01B 32/162*** | (2017.01) |
| *B82Y 30/00* | (2011.01) |
| *B82Y 40/00* | (2011.01) |

(52) U.S. Cl.

CPC ............ *B01J 35/45* (2024.01); *B01J 35/613* (2024.01); *B01J 35/633* (2024.01); *B01J 35/70* (2024.01); *B01J 35/77* (2024.01); *B01J 37/0036* (2013.01); *B01J 37/18* (2013.01); *C01B 32/162* (2017.08); *B01J 2235/00* (2024.01); *B01J 2235/15* (2024.01); *B01J 2235/30* (2024.01); *B82Y 30/00* (2013.01); *B82Y 40/00* (2013.01); *C01B 2202/06* (2013.01); *C01B 2202/36* (2013.01)

(56) References Cited

U.S. PATENT DOCUMENTS

| | | | | |
|---|---|---|---|---|
| 2006/0099127 | A1 | 5/2006 | Zaluska et al. | |
| 2010/0207053 | A1 | 8/2010 | Ryu et al. | |
| 2013/0143736 | A1 | 6/2013 | Koranne et al. | |
| 2019/0160454 | A1 | 5/2019 | Park | |
| 2021/0322996 | A1* | 10/2021 | Bai | C04B 35/5618 |

FOREIGN PATENT DOCUMENTS

| | | | | | |
|---|---|---|---|---|---|
| CN | 109529848 | A | * | 3/2019 | |
| WO | 2013158160 | A1 | | 10/2013 | |
| WO | WO-2018187213 | A1 | * | 10/2018 | C01B 3/382 |
| WO | WO-2020042948 | A1 | * | 3/2020 | B02C 17/04 |

OTHER PUBLICATIONS

House et al. "Effect of ball-milling duration and dehydrogenation on the morphology, microstructure and catalyst dispersion in Ni-catalyzed MgH2 hydrogen storage materials", Acta Materialia 86 (2015) 55-68 (Year: 2015).*

Manukyan et al. "Nickel Oxide Reduction by Hydrogen: Kinetics and Structural Transformations", J. Phys. Chem. C 2015, 119, 16131-16138 (Year: 2015).*

Machine Translation, CN-109529848-A, Mo L, Mar. 29, 2019 (Year: 2019).*

Pendyala et al., "Fischer-Tropsch synthesis: Effect of catalyst particle (sieve) size range on activity, selectivity, and aging of a Pt promoted Co/Al2O3 catalyst", Chemical Engineering Journal 249 (2014) 279-284 (Year: 2014).*

Kobayashi et al. "Effect of NiO content in mesoporous NiO—Al2O3 catalysts for high pressure partial oxidation of methane to syngas", Applied Catalysis A: General 395 (2011) 129-137 (Year: 2011).*

Chai et al., "Synthesizing carbon nanotubes and carbon nanofibers over supported-nickel oxide catalysts via catalytic decomposition of methane", Diamond & Related Materials 16 (2007) 1656-1664 (Year: 2007).*

Simply Bearings, "316 Stainless Steel Loose Ball Bearings", (Year: 2024).*

International Search Report for related International Application No. PCT/QA2020/050012; action dated Jun. 24, 2021; (2 pages).

Written Opinion for related International Application No. PCT/QA2020/050012; action dated Jun. 24, 2021; (6 pages).

Saraswat, et al.; "Ni—Cu—Zn/MCM-22 catalyst for simultaneous production of hydrogen and multiwall carbon nanotubes via thermo-catalytic decomposition of methane"; International Journal of Hydrogen Energy; vol. 36, Sep. 8, 2011; pp. 13352-13360.

Extended European Search Report for related European Application No. 20903512.0; action dated Jan. 4, 2024; (8 pages).

Khavarian, et al; "Direct use of as-synthesized multi-walled carbon nanotubes for carbon dioxide reforming of methane for producing synthesis gas"; Chemical Engineering Journal; 2014; (9 pages).

Office Action and search report for related Chinese Application No. 202080093222.6; action dated Feb. 28, 2024; (8 pages).

* cited by examiner

CATALYSTS FOR CARGEN, METHODS OF PREPARING, AND USES OF SAME

CROSS-REFERENCE TO RELATED APPLICATIONS

The present application is a National Stage filing under 35 U.S.C. 371 of International Application No. PCT/QA2020/050012, filed on Oct. 9, 2020, which claims priority to U.S. Provisional Application No. 62/949,133 filed on Dec. 17, 2019, the entire contents of which are being incorporated herein by reference.

PRIORITY

The present application claims priority to U.S. Ser. No. 62/949,133, filed Dec. 17, 2019. the entire contents of which are being incorporated herein by reference.

BACKGROUND

The reforming of methane is one of the most common industrial processes for conversion of organic compounds (e.g., natural gas, which is composed primarily of methane) to synthesis gas (or "syngas") using an oxidant. Syngas, which is primarily a mixture of hydrogen and carbon monoxide, is an important feedstock to produce a variety of value-added chemicals, particularly hydrocarbon cuts, such as liquid transportation fuels via Fischer-Tropsch synthesis, methanol and dimethyl ether, for example. The oxidant used for reforming of the methane determines its type. For example, in the case of steam reforming, steam is used as the oxidant. Steam reforming of methane uses the following reaction, with $\Delta H_{298}$=206 kJ/mol $$CH_4+H_2O \rightarrow CO+3H_2 \quad (1)$$

In partial oxidation, oxygen is used as an oxidant to produce syngas. Partial oxidation of methane is performed as follows, with $\Delta H_{298}$=−43 kJ/mol $$CH_4+\tfrac{1}{2}O_2 \leftrightarrow CO+2H_2 \quad (2)$$

In dry reforming, carbon dioxide is utilized for oxidation purposes, with $\Delta H_{298}$=247 kJ/mol $$CH_4+CO_2 \leftrightarrow 2CO+2H_2 \quad (3)$$

Most research in methane reforming is directed towards improvement in the reactant conversions, either through new catalyst materials or by optimization of the operating conditions for a set objective. Recently, attention has been directed towards the "dry" reforming of methane due to its ability to convert the two greenhouse gases methane and carbon dioxide) to syngas. However, the commercial applicability of dry reforming of methane has been very limited due to its inherent process limitations, such as carbon deposition, high endothermicity of the reaction, and low values of synthesis gas yield ratios ($H_2$:CO). A well-accepted pathway for carbon formation, from methane, during the dry reforming reaction is given below:

$$CH_4(s) \rightarrow CH_x(s)+(4-x)H(s \quad (4)$$

$$CH_x(s) \rightarrow C(s)+xH(s) \quad (5)$$

$$H(s)+H(s) \rightarrow H_2(g) \quad (6)$$

A pathway for carbon formation, from carbon dioxide, during the dry reforming reaction is as follows:

$$CO_2(g) \rightarrow CO(s)+O() \quad (7)$$

$$CO(s) \rightarrow C(s)+O(s) \quad (8)$$

$$O(s)+O(s) \rightarrow O2(g) \quad (9)$$

$$O(s)+H(s) \rightarrow H(s)+H_2O(g) \quad (10)$$

Thus far, the implementation of such dry reforming reactions has typically suffered from carbon formation in the dry reforming reaction. The carbon formed on the surface of the catalyst deactivates the catalyst due to formation of the carbonate phase, thus either requiring frequent regeneration or, in certain cases, permanently destroying the active site. It would be desirable to design a reactor for implementing the dry reforming of methane with enhanced carbon dioxide fixation. Thus, a reactor system and process solving the aforementioned problems is desired.

This invention relates to the novel CARGEN (or CARbon GENerator) process (US2020/0109050A1, WO2018187213A1)[1]. Described herein is a unique and highly scalable catalyst preparation recipe for the CARGEN reaction. CARGEN reactor comprises of two reactors in series, in which the first reactor is called the CARGEN reactor, while the second reactor is called a reformer. The first reactor converts $CH_4$ and $CO_2$ to solid carbon along with gaseous products CO, $H_2$, $H_2O$, and unconverted $CH_4$ and $CO_2$. The form of carbon produced from the CARGEN reactor, in particular, is the multi-walled carbon nanotube (MWCNT) with some impurities of amorphous and graphitic carbon. The gases evolved from the CARGEN reactor are directly processed in the reformer reactor to produce a high concentration mixture of CO and $H_2$ in a ratio that meets downstream applications. FIG. 1 provides a systematic overview of the CARGEN process.

CARGEN technology is a unique advancement in the field of dry reforming of methane (DRM), in which $CO_2$ and $CH_4$ are converted into syngas (a mixture of hydrogen and carbon monoxide)[2], as discussed above. DRM is a heterogeneous reaction, meaning that it is a catalytic process. Also, this reaction is severely affected by the formation of solid carbon mostly due to two side reactions as follows[3-5]:

i) Boudouard reaction, or CO disproportionation reaction: $2CO \rightarrow CO_2+C$ (11)

ii) Methane decomposition reaction: $CH_4 \rightarrow C+2H_2$ (12)

The formation of solid carbon leads to the deactivation of the catalyst as the carbon formed reduces accessibility to the catalyst active site and, therefore, not allowing the reaction to continue for a longer time[6]. Catalyst deactivation is particularly an issue in DRM, which has significantly offset its implementation on an industrial scale. The reason behind such a peculiar carbon forming behavior in DRM is the unavailability of sufficient oxygen and hydrogen in the reaction gas[7]. The O:C:H ratio in DRM is 1:1:2, while for other conventional reforming processes like for partial oxidation (PDX), it is 1:1:4, and for steam methane reforming (SRM) it is 1:1:6[7]. Due to the scarcity of enough hydrogen and oxygen in the reaction gases, the surface carbon is unable to react and stays permanently at the surface. During this time, it continues binding with other surface carbon molecules and form strong C—C bonds that either result in the formation of amorphous or graphitic or carbon nanotube type of carbon[6]. The type and morphology of the surface carbon depend upon the type of the catalyst material, the surface energy, and the surface sites.

CNT growth, in particular, is believed to happen via two different mechanisms[6,8]: (a) Tip growth mechanism—wherein CNT growth happens below the catalyst crystal site, and CNT is present between the active site and the support. In this case, the metal support interaction is not very strong, which allows for the movement of the active material easily across the bed.[9] (b) Base growth mechanism—wherein CNT growth happens above the catalyst crystal site, and the active catalyst site is bound strongly at the support surface. It is believed that the tip growth mechanism is the most active for carbon formation (and worst choice) for the DRM process since it enables large carbon formation and accumulation due to weak metal-support interaction[9]. Also, the formation of CNTs will lead to a continuous change in the surface distribution of the active sites on the bed when the metal-support interaction is weak.

Since the objective of the CARGEN unit is to form CNTs, it is required to synthesize a catalyst that provides specific characteristics that promote CNT formation growth. This approach of intensifying CNT growth formation on the surface is not a desirable feature of any methane reforming catalyst; however, it is the most necessary feature for the CARGEN catalyst. The idea is to adjust the catalyst selectivity towards CNT and not towards syngas. Therefore, a catalyst material that provides essential features for CNT growth like the metal-support interaction, the acidity/basicity of the catalyst site, will be of use for the CARGEN process[9].

The inventors have found that the most critical parameter that influences the CNT growth is the metal-support interaction[10-14]. The weaker the interaction or the loosely bound the active metal is, the more will be its ability to grow CNT. Besides, the crystallite size also has a tremendous impact on the size (diameter) of the CNT which was a direct result from microscopy assessment of our various spent CARGEN catalyst samples that were studied to develop the said CARGEN catalyst. Additionally, this assessment is also in line with some of the previous works[10-17]. The tailor-made CARGEN catalyst presented herein is synthesized in such a way that it benefits from the weak metal-support interaction to allow for rapid growth of CNTs while facilitating great active metal mobility.

Environmental implications of the synthesis of tons of quantity of industrial catalysts are one of the critical decision-making parameters that are considered before any commercialization plan. This includes the consideration of the precursors needed and the waste generated from the process.

The conventional catalyst synthesis route includes the following methods[17]:

i) Incipient Wet Impregnation (IWI) method in which the target active metal is dissolved in an organic or aqueous solution depending upon the type and nature of the active metal: This solution is poured on to support, which has the same pore volume as the volume of the metal solution. Due to capillary action, all of the metal solutions are drawn into the support pores. If the solution volume is more than the pore volume, then the diffusion process takes over, which results in much slower transport of the active metal to the pore. The catalyst slurry is then dried and calcined to eliminate all the volatile components within the solution while depositing the active metal on the catalyst support. The limitation is that the loading of the active metal is restricted to the solubility of the active metal solution. Therefore, the choice of solution is very critical in this process. The downside of this process, on the other hand, is that this process produces harmful and toxic volatile compounds upon calcination and requires a large quantity of solvent for making the solution, sometimes even ten times in weight compared to the catalyst weight produced. Therefore, this type of catalyst is far from being environmentally sustainable.

ii) Precipitation method in which the precipitates form from a homogeneous liquid as a result of transformation in temperature or by chemical reaction: The chemical reaction may happen due to the addition of acids or bases to a basic or acidic solution, respectively. It could also occur due to the addition of complex coagulating agents. In almost all the processes, either nucleation happens first, or simultaneously with agglomeration. Nucleation refers to the process in which small particles of solids start forming as a result of the transformation. In contrast, agglomeration refers to the growth of the particles due to the formation of new particles, or association of existing particles. Again, due to the involvement of large quantities of chemical reagents and the production of wastes, this process is not environmentally sustainable.

iii) Co-Precipitation method, which is generally a method for the synthesis of a multi-component system: In this method, macroscopic homogeneity is not easy to obtain, as the composition of the precipitate depends upon the differences in solubility between the components and the chemistry occurring during precipitation. One of the critical applications of this process is to synthesize molecular sieves. Similar to the precipitation and IWI methods, this method also involves the use of numerous solvents and reagents that may lead to the generation of vast quantities of wastes that are not sustainable environmentally.

Other catalyst preparation methods include, for example, sol-gel, hydrothermal, gelation, crystallization, etc., which require significant amounts of chemical reagents in quantities tens of times more in weight compared to the final weight of the synthesized catalyst[17]. Although these methods may have proven very useful for catalyst synthesis, there is significant trepidation in their implementation due to environmental concerns.

Therefore, there is a need to identify better catalyst synthesis processes that are more sustainable and scalable at the same time. More importantly, if the goal of the entire process (e.g., DRM or CARGEN) is for improving sustainability and reduce carbon emissions, the role of green catalyst and sustainable approaches become very critical.

The traditional ball milling process used for catalyst synthesis is a grinding method in which solids are ground together into very fine powders[14]. During this process, extremely high localized pressure is created at the point of collision of the rigid balls. These colliding balls are made from ceramics, flint pebbles, and stainless steel. Milling time, rpm of the rotational containers, size of the balls, and the ratio of sample weight to the number of balls are some of the critical control parameters. In addition to the benefit of ultra-fine grounding, the secondary advantage of the ball milling method is the homogenization of the solid mixture, which is significantly difficult to achieve.

CNT production from methane decomposition and other catalytic hydrocarbon cracking processes form a close group of studies that are related to the CARGEN process. Although both the processes produce carbon nanotubes of various forms, the critical difference between the CARGEN process and the previous processes lies in the basic objective and philosophy of operation, which is to produce syngas from greenhouse gases $CO_2$ and $CH_4$. As noted earlier, the CARGEN reactor could be considered as an adjustment block to process the feed to the reformer so that the final syngas ratio ($H_2$:CO) is consistent with the downstream application, like methanol production, Fischer Tropsch synthesis, etc.

KR20110092274A discloses a catalyst including cobalt and molybdenum in the ratio of 1:0 to 2:3. Applicable processes involve methane, ethylene and acetylene cracking.

U.S. Pat. No. 4,663,230A discloses a catalyst that comprises an iron, cobalt, or nickel containing particle having a diameter between about 3.5 and about 70 nanometers. Applicable processes involve methane, ethane, propane, ethylene, propylene or acetylene—or mixtures thereof.

U.S. Pat. No. 6,333,016B1 discloses a catalyst that contains at least one metal from Group VIII, including for example Co, Ni, Ru, Rh, Pd, Ir, and Pt, and at least one metal from Group VIb including for example Mo, W and Cr. Applicable processes involve a carbon-containing gas selected from the group consisting of saturated hydrocarbons, aliphatic hydrocarbons, oxygenated hydrocarbons, aromatic hydrocarbons, carbon monoxide, and mixtures thereof.

JP4068056B2 discloses a catalyst supported on hydroxides and/or carbonates or mixtures thereof that includes a dispersion of nanoparticles comprising a metal of any oxidation state, said metal, Fe, Co, Ni, V , Cu, Mo, Sn, and/or catalyst system selected from the group consisting of mixtures. The catalyst system support is made from $CaCO_3$, $MgCO_3$, $Al_2(CO_3)_3$, $Ce_2(CO_3)_3$, $Ti(CO_3)_2$, $La_2(CO_3)_3$, and/or mixtures thereof. Applicable processes involve catalytic cracking of acetylene, ethylene, butane, propane, ethane, methane, or any other gas or volatile carbon-containing compound.

AU2004234395A1 discloses a catalyst that is a carbon nanotube-ceramic composite comprising a metallic catalytic particle, comprising at least one of Co, Ni, Ru, Rh, Pd, Ir, Pt, at least one Group Vlb metal, and a support material, combined to have a particulate form. Applicable processes involve a carbon containing gas is selected from the group consisting of saturated hydrocarbons, aliphatic hydrocarbons, oxygenated hydrocarbons, aromatic hydrocarbons, alcohols, carbon monoxide, and mixtures thereof.

U.S. Pat. No. 7,628,974B2 discloses a catalyst that comprises at least one member selected from the group consisting of Fe, Mo, Co, Ni, Ti, Cr, Ru, Mn, Re, Rh, Pd, V and alloys thereof. Applicable processes involve cracking of hydrocarbons not limited to aliphatic hydrocarbons, aromatic hydrocarbons, carbonyls, halogenated hydrocarbons, silyated hydrocarbons, alcohols, ethers, aldehydes, ketones, acids, phenols, esters, amines, alkylnitrile, thioethers, cyanates, nitroalkyl, alkylnitrate, and/or mixtures of one or more of the above, and more typically methane, ethane, propane, butane, ethylene, acetylene, carbon monoxide, benzene and methylsilane.

U.S. Pat. No. 6,849,245B2 discloses a catalyst material comprising of Group VIII metals (Fe, Ni, Co), and possibly mixed with Group IB such as Cu, Ag and Au. Applicable processes involve a carbon-containing compound selected from CO, methane, ethane, ethylene, acetylene, propane, propylene, butane, butene, butadiene, pentane, etc.

US20050025695A1 discloses a metal oxide catalyst selected from the metals including iron, nickel, cobalt, lanthanum, gold, silver, molybdenum, iron-nickel, iron-copper and their alloys. Applicable processes involve a flame synthesis method for conversion of a mixture of CO and $H_2$ in to carbon nanostructures and also selected "carbonaceous feedstock."

US20050232843A1 discloses a metal selected from the group consisting of platinum, palladium, nickel, iron, cobalt, ruthenium, tungsten, and molybdenum. Applicable processes involve a method involving heating a vapor of a solution comprising carbon, oxygen, hydrogen, and sulfur as components in an atmosphere of a saturated vapor of the solution.

U.S. Pat. No. 9,409,779B2 discloses a heterogeneous catalyst which comprises Mn, Co, preferably also molybdenum, and an inert support material, and the catalyst and the carbon nanotubes themselves and the use thereof. Applicable processes involve catalytic cracking of light hydrocarbons, such as aliphatics and olefins. However, alcohols, carbon oxides, in particular CO, aromatic compounds with and without hetero atoms and functionalized hydrocarbons, such as e.g. aldehydes or ketones, can also be employed as long as these are decomposed on the catalyst. Other selected hydrocarbons are listed in the patent document.

BRIEF DESCRIPTION OF THE DRAWINGS

Features and advantages of the inventions described herein may be better understood by reference to the accompanying drawings in which.

SUMMARY

Figure 1:
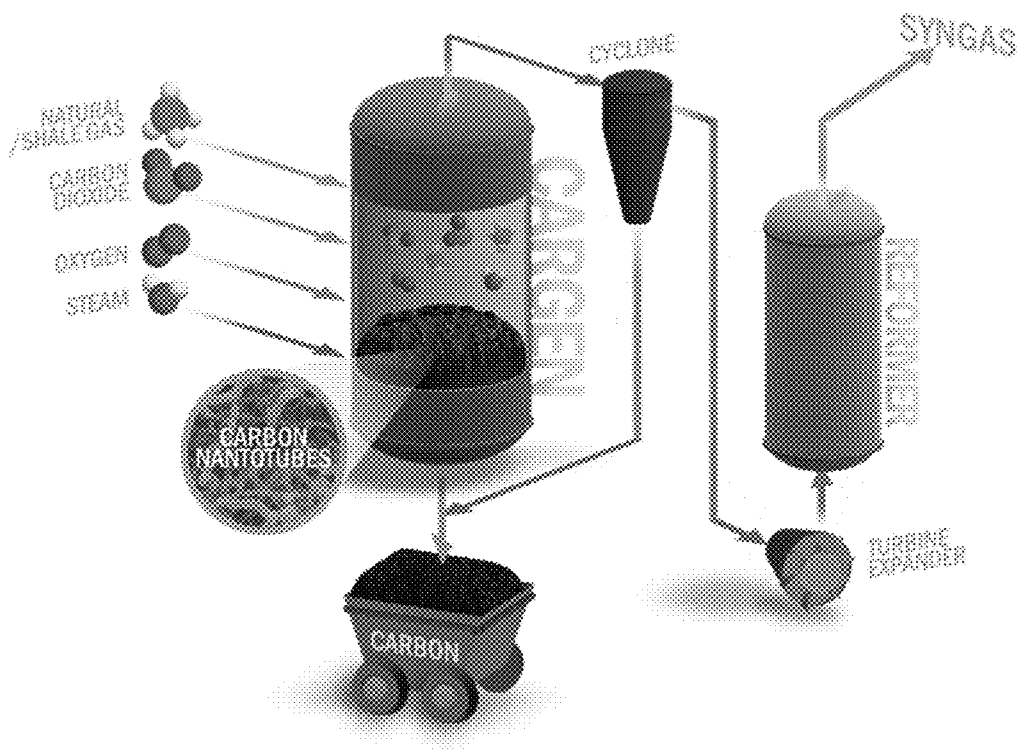
FIG. 1 is a systematic overview of the CARGEN process.

In a general embodiment, the present disclosure provides a method of preparing a catalyst for CARGEN process, the method comprising milling a transition metal oxide, wherein the catalyst is supported or unsupported.

In one embodiment, the transition metal oxide may comprise nickel oxide.

In one embodiment, the catalyst is supported by a support material that may comprise alumina.

In one embodiment, the catalyst may comprise alumina oxide.

In one embodiment, an amount of the transition metal oxide may be about 20 wt % of the total amount of the transition metal oxide and the support.

In one embodiment, the transition metal oxide and the support may be milled in a ball milling apparatus.

In one embodiment, the ball milling apparatus may comprise stainless steel balls of 5 mm diameter.

In one embodiment, the method may comprise milling the transition metal oxide and the support for about 1 hour.

In one embodiment, the method may comprise mixing the transition metal oxide with the support before the milling, and the milling producing a solid mixture of the transition metal oxide and the support.

In one embodiment, the method may comprise reducing the milled transition metal oxide with a reduction gas.

In one embodiment, the reduction gas may comprise hydrogen.

In one embodiment, a ratio of the number of balls in the ball milling apparatus to the weight of the catalyst in grams may be from about 1:1 to about 100:1.

In one embodiment, a ratio of the number of balls in the ball milling apparatus to the weight of the catalyst in grams may be from about 1:1 to about 10:1.

In one embodiment, a ratio of the number of balls in the ball milling apparatus to the weight of the catalyst in grams may be from about 10:1 to about 100:1.

In one embodiment, a ratio of the number of balls in the ball milling apparatus to the weight of the catalyst in grams may be about 10:1.

In one embodiment, the catalyst may have a total surface area of greater than 10 $m^2/g$.

In one embodiment, the catalyst may have a pore volume of at least 10 $cm^3/g$

Another embodiment provides a method of using the produced catalyst for CARGEN process.

A method of preparing a catalyst for a Carbon Generator Reactor (CARGEN) process is provided in an embodiment. The method includes milling a precursor material, wherein the catalyst is supported or unsupported. In an embodiment, the precursor material includes at least one of Fe, Ni, Co, Pt, Ru, Mo, a lanthanide or the like. The lanthanide can include, for example, Ce, Pr, Nd, Pm, Sm, Eu, Gd, Tb, Dy, Ho, Er, Tm, Yb, Lu or the like.

Additional features and advantages are described herein, and will be apparent from the following detailed description.

DETAILED DESCRIPTION

The present disclosure provides high conversion and high carbon yielding CARGEN catalysts, methods of preparing same, and uses of same for CARGEN. The disclosed catalyst is inexpensive, but highly effective and suitable for the CARGEN process disclosed in WO2018187213, which is entirely incorporated herein by reference.

Specifically, a highly active reforming catalyst tailor-made for CARGEN process is presented. The catalyst is specifically designed to form multi-walled carbon nanotubes (MWCNT) per the conditions prescribed in the inventors' previous patent application US2020/0109050, which is also entirely incorporated herein by reference, and WO2018187213. The catalyst is synthesized via ball milling technique in order to provide a unique active metal-support interaction that is favorable to form MWCNT in the CARGEN process. The catalyst is suitable for use in packed bed, chemical vapor deposition (CVD), and fluidized bed mode of operation, while the main task of the catalyst is to convert natural gas and carbon dioxide into MWCNT along with syngas and water.

The CARGEN catalyst of the present invention is prepared using a unique catalyst synthesis technique that involves the use of traditional ball mills. Since the ball milling process is a unit operation that could be conducted using electricity, the generation of wastes from such a process is minimal.

CARGEN is the first reactor in a two-reactor system that provides enhanced carbon dioxide utilization for chemical and fuels processes, while ensuring fixation of $CO_2$; the amount of $CO_2$ utilized is less than that generated during the process. The first reactor converts $CH_4$ and $CO_{2\,d}$into solid carbon, while the second reactor converts $CH_4$ and $CO_2$ to syngas using a combined reforming reaction process. In view of the global concern of greenhouse gas emissions, such a two-reactor system enhances overall $CO_2$ fixation, unlike conventional single reactor reformer systems. From a $CO_2$ life cycle assessment (LCA) and a process integration point of view, this system facilitates $CO_2$ utilization in methane reforming at fixation conditions while producing both solid carbon and syngas. The latter, syngas, is an important feedstock for production of a variety of value-added chemicals, as well as ultra-clean liquid fuels.

A combined reforming process is aimed at reacting methane (or any other volatile organic compound) with $CO_2$, and optionally other oxidants such as $O_2$, $H_2O$, or both to produce syngas. Optimal operational conditions of temperature and pressure of the two reactors can be determined using a thermodynamics equilibrium analysis. Any reaction feasible thermodynamically indicates that the reaction can be carried out, given that the hurdles associated with the process are tackled via the development of an efficient catalyst and reactor orientation.

CARGEN aims to maximize $CO_2$ fixation by optimization of the operating conditions, which could maximize carbon formation in the first reactor in the limited presence of oxygen to drive the reaction auto-thermally. As the partial combustion or partial oxidation reaction is an exothermic reaction, the CARGEN reactor hosts two main reactions concerning the $CO_2$ fixation. The first reaction includes conversion of $CO_2$ to carbon. The second reaction includes a partial oxidation reaction utilizing a portion of methane (or any other volatile organic compound) for partial combustion to produce energy, among other products. The energy provided through partial oxidation reaction is more efficient compared to any other form of heat transfer, as this energy is generated in-situ in the process itself.

The CARGEN reactor may be operated under low temperature and low/high pressure conditions, while the combined reformer (second reactor) may be operated at high temperature and low/high pressure conditions. By tapping the advantage of pressure and temperature swings between the two reactor units, improvements occur in both $CO_2$ fixation, as well as reduction in overall energy requirements of the dual reactor setup. The CARGEN process utilizes work and energy extraction processes (like turbine, expanders etc.) associated with the change in pressure between the two reactors to overcome the pre-compression duty of the feed gas, at least partially. Thus, a unique synergism evident between the two reactors is beneficial for saving carbon credits, as well as improving sustainability of the overall process. In addition to the syngas generated from the second reactor (reformer reactor), the CARGEN process also produces solid carbon or carbonaceous material from the first reactor (CARGEN reactor). This carbonaceous product, which is produced as a part of the $CO_2$ fixation process, is industrially valuable. In particular, the carbonaceous product may serve as a starting material to produce many value-added chemicals that can generate substantial revenue for the process plant. Non-limiting examples of the valuable chemicals include activated carbon, carbon black, carbon fiber, graphite of different grades, earthen materials, etc. This material can also be added to structural materials like cement and concrete and in road tar or in wax preparation as a part of the overall $CO_2$ capture process.

The CARGEN process includes a dry reforming process for conversion of carbon dioxide to syngas and carbon. The CARGEN process enhances $CO_2$ fixation using a two-reactor setup or system. The reaction scheme is divided into two processes in separate reactors in series. The first reaction is targeted to capture $CO_2$ as solid carbon and the other to convert $CO_2$ to syngas. The present subject flatter provides a systematic approach for $CO_2$ fixation, There can be significant conversions of $CO_2$ to carbon at auto-thermal low temperature conditions (<773.15 K) in the first reactor of the two-reactor setup. The subsequent removal of solid carbon from the system (first reactor) enhances $CO_2$ conversions to syngas in the second reactor by thermodynamically pushing the reaction forward, As such, the carbon from the system is removed, which is incredibly beneficial from the perspective of the $CO_2$ life cycle assessment (LCA).

After the reaction in the first reactor, the solid carbon is filtered. The remaining product gases are fed to a higher temperature second reactor (a combined reformer) with the main focus of producing high quality syngas. Thermodynamic analysis of the results of operation of the second reactor shows that there is no carbon formation. This drives the reaction forward at much lesser energy requirements (approximately 50 kJ less) and at relatively lower temperatures in comparison to conventional reformer setups. A substantial increase in the syngas yield ratio is also seen, which is not only beneficial for syngas production for Fischer Tropsch synthesis (requiring approximately a 2:1 $H_2$:CO ratio), but also for the hydrogen production (which requires high $H_2$:CO ratios).

In addition to the advantage of getting a higher $H_2$:CO ratio, a significant increase in the methane and carbon dioxide conversion is also seen at much lower operating temperatures. If a conventional reforming setup was used, such effects would be obtained only at higher temperatures (almost 250 °C). The advantage of removing carbon in the first reformer helps to bring down the operating temperature in the second reactor significantly. As such, the CARGEN process is much more energy efficient than the conventional single reactor setup operated at higher temperatures to get similar levels of methane and carbon dioxide conversions at zero carbon deposition.

In addition to the advantage of getting a higher $H_2$:CO ratio, a significant increase in the methane and carbon dioxide conversion is also seen at much lower operating temperatures. If a conventional reforming setup was used, such effects would be obtained only at higher temperatures (almost 250 °C). The advantage of removing carbon in the first reformer helps to bring down the operating temperature in the second reactor significantly. As such, the present subject matter is much more energy efficient than the conventional single reactor setup operated at higher temperatures to get similar levels of methane and carbon dioxide conversions at zero carbon deposition.

In the present process, carbon dioxide is partially utilized in the first reactor by co-feeding methane and/or oxygen and/or steam together or separately to the first reactor in order to produce solid carbon as product only. The operational conditions of the CARGEN reactor are chosen so that it promotes solid carbon and does not promote syngas. Consequently, the objective of the second reactor, a modified reforming reactor, is to produce syngas from the raw gas (mainly unconverted methane, carbon dioxide, steam, etc.) exiting the CARGEN reactor.

From the perspective of energy utilization and efficiency, the CARGEN process produces an environment conducive to production of a single product in two separate reactors. Additionally, the present approach may utilize a relatively inexpensive catalyst (e.g., naturally occurring minerals such as calcite dolomite, coal, etc.) in the first reactor (CARGEN) to help in improving carbon formation. Due to significant reduction of carbon dioxide concentration from the first reactor, carbon formation tendency of the second reactor is almost eliminated. Therefore, an avenue is opened for the utilization of expensive, high stability, and high resistance catalyst for a longer operational time on stream.

Further, due to the unique method of segregation of operational conditions in the two different reactors, the CARGEN process provides a unique opportunity for handling of the two products separately. For instance, the second reactor (which is mainly carbon formation free) does not need to undergo maintenance when the first reactor (CARGEN) is under maintenance. During such a situation, more than one CARGEN reactor could be added in parallel to ensure continuous operation.

Additionally, the catalyst removal process in the first reactor and the second reactor would be different, as the second reactor may utilize a more expensive catalyst and would not require many maintenance cycles but could undergo regeneration more frequently. On the other hand, the first reactor may require many maintenance cycles and less frequent catalyst regeneration. The difference in the method of handling of catalysts and operational conditions for production of the two products separately makes the CARGEN process unique when compared to conventional systems and methods.

The remaining reactant gas mixture can be used for the reforming reaction in the separate second reactor for carrying out the dry reforming reaction, while discarding the sacrificial surface (catalyst) in the CARGEN.

The inexpensive or sacrificial catalyst material can be discarded in a batch- wise process while loading a new material. The CARGEN can be used for carbon capture while using the regenerated catalyst from a separate regenerator operated in parallel mode. The sacrificial surface (catalyst) can be treated separately to at least partially recover the catalyst while removing solids (including carbon and sacrificed material).

The CARGEN may, optionally, be operated under no additional steam basis, as addition of steam increases both the energy demands and compromises the formation of coke. However, steam may be added to the second reformer (also called operated as combined. Dry/Steam reforming) for increasing the conversion of the methane.

Addition of oxygen to both the CARGEN and/or to the combined reformer improves carbon capture performance, as it increases carbon formation in the CARGEN and also decreases the overall energy demands of the dual reactor setup.

Removal of the carbon (mechanically or with the spent catalyst) from the CARGEN pushes the reforming reaction forward in the second reactor (combined reformer) and thus subsequently increases the overall $CO_2$ and methane conversions to syngas significantly.

Steam may be added to the second reactor to produce hydrogen rich syngas for hydrogen production. Using steam in the second reactor increases hydrogen in the system significantly.

The product gas mixture from the second reactor can at least be used as a feed stock for production of hydrogen, as a feed stock for Fischer Tropsch synthesis reaction, and as a teed stock for use as a source of energy in a hydrogen-based fuel cell. The reactant gas may be an output product of a furnace in a process plant and may be a combination of the flue gases and/or carbon dioxide and unreacted methane.

The CARGEN reactor may be operated under auto-thermal conditions by using oxygen as an additive for partial combustion (or oxidation) as the energy source. Auto-thermal low temperature (below 773 K) is associated with zero carbon credits, and thus has more impact in fixation of $CO_2$ from the life cycle of the process plant. The CARGEN reactor can be operated under low temperature and low/high pressure conditions, while the second reactor can be operated at high temperature and low/high pressure conditions.

The first reactor (the CARGEN reactor) comprises a mechanical housing facility to receive methane, the carbon dioxide, and at least one more oxidant (oxygen etc). The first reactor may also comprise a housing/mechanism which actuates the removal and reloading (of a new hatch or regenerated batch) of the sacrificial catalytic material for carbon capture. The captured carbon on the sacrificial catalyst material may be recovered partially or completely based on the cost benefit analysis.

A pretreatment process may be incorporated between the two reactors, which comprises of heating, cyclone separation, and mixing of an additional oxidant (oxygen or steam or both with the gases leaving the CARGEN) for the second combined reformer. In such a process, the catalyst chosen is compatible for combined reforming reaction in the second reactor.

A pressure swing between the two reactors with a high pressure in first reactor and lower pressure in a second reactor can significantly affect carbon formation and energy requirements in the overall system. A pressure swing between the two reactors with a lower pressure in first reactor and higher pressure in a second reactor significantly reduces net energy demands but decreases overall $CO_2$% conversion.

The first reactor can be operated under auto-thermal conditions (by addition of pure oxygen along with $CO_2$ and methane) at a pressure higher than the second reactor, with no addition of steam to both the reactors. Steam may however be added only to increase hydrogen content of product syngas if needed (for hydrogen production etc.).

Pressure swings between the reactors may be achieved by using an expander unit which decreases the pressure while deriving high quality shaft work, which may be used elsewhere in the plant. Pressure swings between the reactors also may be achieved by using a turbine generator unit which decreases the pressure while deriving high quality shaft work, which could be used elsewhere in the plant.

The carbon dioxide capture process may be carried out in a continuous operation by at least one additional train to switch back and forth during cycles of maintenance and operations.

The regeneration process may be carried out by using any potential volatile organic compound (e.g., ethanol, methanol, glycerol etc.) in place of methane or any such combinations.

in addition, the configuration of the CARGEN reactor may be utilized to produce a carbonaceous compound alone as carbon dioxide fixation from the CARGEN process. This may pertain to industrial production of black ink for printers and pertain to industrial production of graphite of different grades, which may be used for manufacturing of cast iron/steel or batteries of different grades.

Furthermore, the energy utilization of the regeneration process can be extremely low (almost 50%) compared to existing technologies. The CARGEN process also has the benefit of high efficiency, as the CARGEN process has the capability to convert more than 65% $CO_2$ per pass of reactor.

The disclosed catalyst may comprise transition metals that may be supported or unsupported. The preparation method involves mixing oxide of the transition metal with a suitable support or without a support in a standard ball milling apparatus to produce a fine and homogenous solid mixture of the transition metal oxide and support.

The disclosed catalyst provides a surface for reaction wherein the reaction gases comprising methane, $CO_2$, $H_2O$, and/or $O_2$ etc can react. The specific utility of this catalyst is for the CARGEN process, which produces high quality carbon materials from greenhouse gases. This process could be industrially useful as it presents an inexpensive and scalable method for mass production of catalyst for the CARGEN process.

The CARGEN process is a unique technology in the field of $CO_2$ conversion technology. This catalyst is specifically applicable for the CARGEN process. The catalyst presented in this disclosure targets carbon formation from the reaction gases via the CARGEN process.

In some embodiments, this catalyst can be prepared as follows:

1. Preparation or procurement of transition metal oxide and suitable support;
2. Mixing the transition metal oxide and the support in a suitable ratio in which the transition metal oxide will vary from 0% to 100% of the total batch weight;
3. Using a standard ball milling process to mix the transition metal oxide and the support for a suitable time optimized as a function of total weight of the batch that is being produced;
4. The number of balls used for the ball milling process can be set in such a way that the ratio of the number of balls to weight of the catalyst in grams can be around 10:1, and a variable ratio may also be used in the range of 1:1 to 100:1 as required by the process;
5. The final mix of the supported catalyst may be subjected to reduction with suitable reduction gas, such as hydrogen, and used in the CARGEN process for producing high quality carbon material from greenhouse gases.

These steps are not required to be followed in the exact order and may be interchanged. This process is highly scalable and can be easily implemented on a commercial scale using the standard ball milling process.

The inventors conducted controlled experiments of preparation of catalyst as well as running the experiment under CARGEN stipulated conditions.

In a non-limiting example, the inventors prepared a 20 wt % nickel oxide supported by alumina catalyst using the procedure described above. The catalyst was prepared in a ball milling apparatus that used stainless steel balls of 5 mm diameter. A total of 2 g catalyst was produced, for which such balls were used to prepare the mixture. Ball milling was done for 1 hour, and the resulting catalyst was then subjected to material characterization.

The inventors also performed the following material characterization of the fresh catalyst to determine the features of this catalyst:

1. XRD analysis was conducted to determine the crystal structure of the catalyst. It revealed presence of nickel oxide and alumina oxide as indicated by the presence of sharp peaks in XRD profile.
2. Brunnauer Emmet and Teller (BET) surface area analysis was conducted to determine the surface area of the catalyst. It revealed that the catalyst had a total surface area of 101 $m^2/g$ available. This shows that this method produces extremely high surface area catalyst.
3. BJH Pore Volume of the catalyst was determined, and the results indicated that the pore volume was at least 0.1 $cm^3/g$ of the catalyst.

4. Temperature Programmed Reduction (TPR) profile was conducted to test the reducibility peak of the catalyst material. TPR profile was generated when temperature was ramped up in a standard Chemisorption equipment under the flow of hydrogen gas on the catalyst sample placed in the U tube. The TPR profile generated was a characteristic of nickel material, which also indicated that the active material was reduced easily and corresponded to pure nickel.

The inventors further performed the following proof of concept experiments that showed that this catalyst works:

1. A standard Thermo Gravimetric Analyzer (TGA) equipment was used to conduct the proof of concept analysis. A weight gain profile is analyzed based on the reaction that happens on the crucible pan of the equipment.
2. Reaction gases comprising methane, carbon dioxide and oxygen in a ratio stipulated by the CARGEN process was passed through the TGA apparatus at 550 °C temperature and the weight gain was monitored on the crucible pan of the equipment.
3. Along with the weight gain, the inventors also monitored the evolved gases and their concentration using a standard Residual Gas Analyzer (RGA) equipment. The RGA data showed that the evolved gases comprise of hydrogen, carbon monoxide, water along with the unreacted gases. This indicated that the reaction happened, and the weight gain was due to carbon formation.

After this experiment, the inventors conducted the following characterization study of the spent catalyst material:

1. SEM was conducted to identify the structure and the type of the material formed during the experiment. Carbon nanotubes were observed of varying diameter from few nanometers to hundreds of nanometers in diameter. Also, the length of the nanotubes was in the range of few nanometers to micrometers, which clearly indicated the formation of carbon nanotubes.
2. The energy dispersive X-ray (EDX) analysis was conducted to test the material surface and its weight concentration. The EDX profile revealed that the surface only comprised carbon, nickel and alumina particles, which clearly demonstrated the formation of carbon material in the CARGEN process.

EXAMPLES

Example 1: Ball Mill CARGEN Catalyst Synthesis i) Nickel oxide particles of size in the range of 50 to 500 μm was produced using conventional techniques that may include calcination of nickel nitrate etc.

ii) Alumina support available from any standard catalyst supplier (SASOL Purolox, Alpha Aesar, Sigma Aldrich, etc.) was mixed with the nickel oxide particles in such a ratio to produce 20% $Ni/Al_2O_3$.

If 1 g of catalyst needs to be prepared, 0.253 g of NiO is mixed with 0.8 g of $Al_2O_3$. The extra 0.053 g of NiO is to account for the presence of oxygen in NiO as our ultimate target is to produce Ni and not NiO.

iii) The catalyst mixture and the balls were loaded in the ball milling container. For this experiment, a Retsch(R) CRYOMILL apparatus was used. The parameters set for this experiment are the following: Rotation rate: 50 Hz at 250 rpm, sample weight (g): number of balls ratio=1:10, ball mass=0.5 g, milling time: 1 hour.

iv) After a milling time of 1 hour, the catalyst mixture was calcined at 400 °C temperature for 4 hours to remove moisture and any other volatile compound that may be present in the catalyst mixture. For calcination, the muffle furnace was set at a ramping rate of 5 °C/min to reach a target of 400 °C and then allowed to dwell for 240 minutes and then slowly ramped down to room temperature.

v) After calcination, the sample was sieved at a 300 μm size range. It was observed that all the particles passed through the sieve, indicating that average particle size was below 300 μm size.

Example 2: Thermo-Gravimetric Analysis (TGA) Experiment

Figure 2:
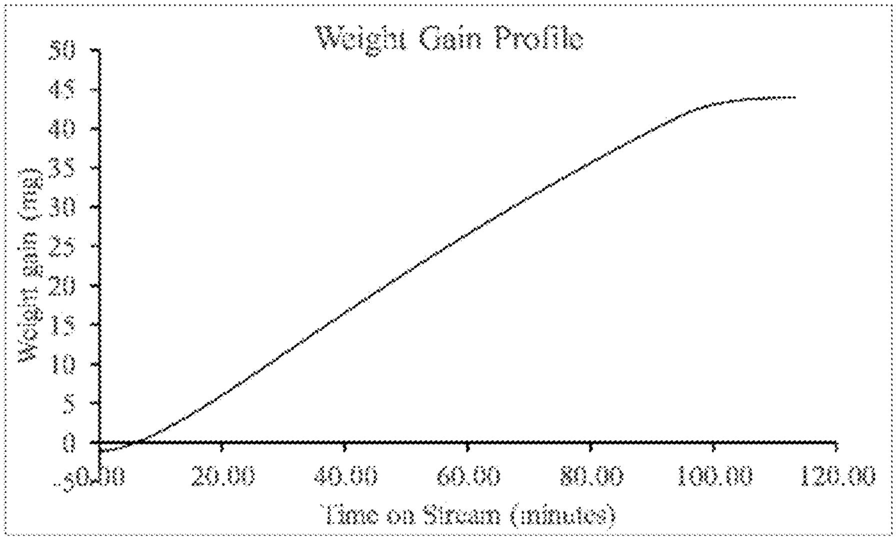
FIG. 2 shows the weight gain profile in thermo-gravimetric analysis (TGA) experiment of the CARGEN catalyst.

TGA analysis was conducted for weight gain testing and proof of concept studies of the CARGEN process. For this, the TGA/SDT Q600 equipment by TA® was used.

i) A 20 mg batch of fresh calcined catalyst was taken and placed in a sample alumina crucible of the TGA equipment. An empty reference alumina crucible of the same weight was kept on the second weighing pan of the crucible to eliminate any weight fluctuation by temperature gain during the experiment.

ii) Next, the weighing pans were tared to record a zero-weight value. Reduction protocol was initiated, which comprises the following steps:

a) Drying at 150 °C temperature for 2 hours;

b) Ramping up the temperature at the rate of 5 °C/min to a target temperature of 800 °C temperature and then hold for 2 hours. After reduction is complete, TGA temperature was ramp down to 550 °C, which is the desirable CARGEN reaction temperature.

c) CARGEN reaction gases comprising of $O_2$, $CO_2$, and $CH_4$ in the ratio of 0.1/0.6/1, respectively, were fed to the TGA reactor to initiate the reaction. The weight gain profile from this experiment is shown in FIG. 2.

Figure 3:
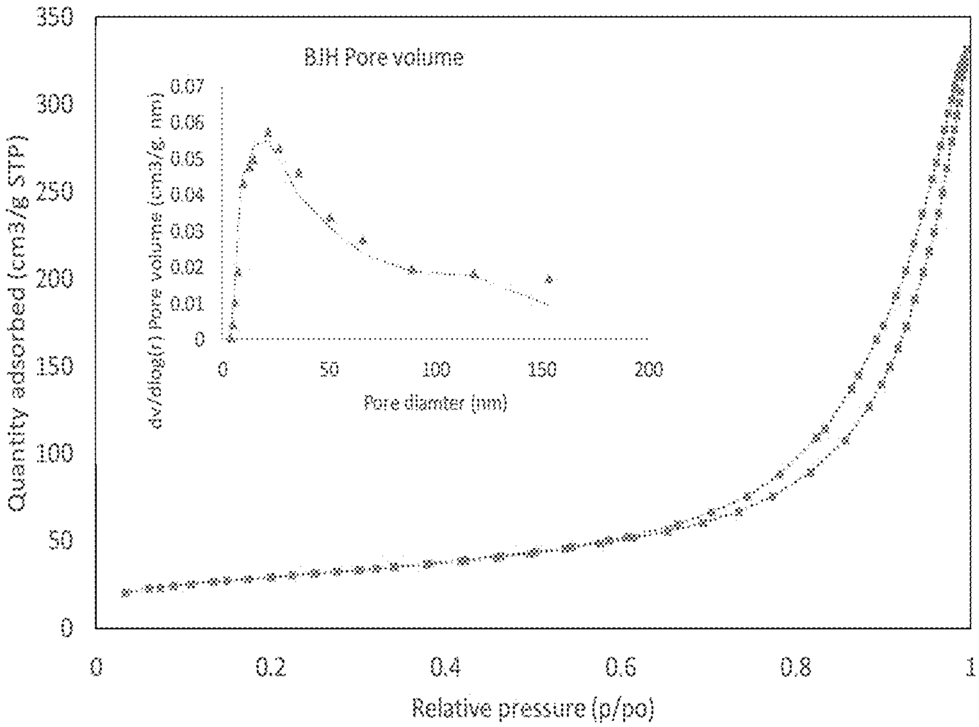
FIG. 3 shows the $N_2$ physisorption isotherm linear plot of the fresh catalyst sample prepared in the examples.

Example 3: Characterization i) Fresh catalyst physisorption: the physisorption data of the fresh catalyst sample was obtained from a standard Tri-star II Micromeritics instrument. Table 1 reports data on the BET surface area and the Barrett-Joyner-Halenda (BJH) pore volume, while the adsorption/desorption isotherms linear plot is provided in FIG. 3.

The fresh catalyst exhibits type-IV type of isotherm with the presence of a type H1 hysteresis loop. BET results suggest that the catalysts particles are mesoporous and are spherical in nature with uniform size and shape.

TABLE 1

Physisorption data of the fresh novel CARGEN catalyst

Figure 4:
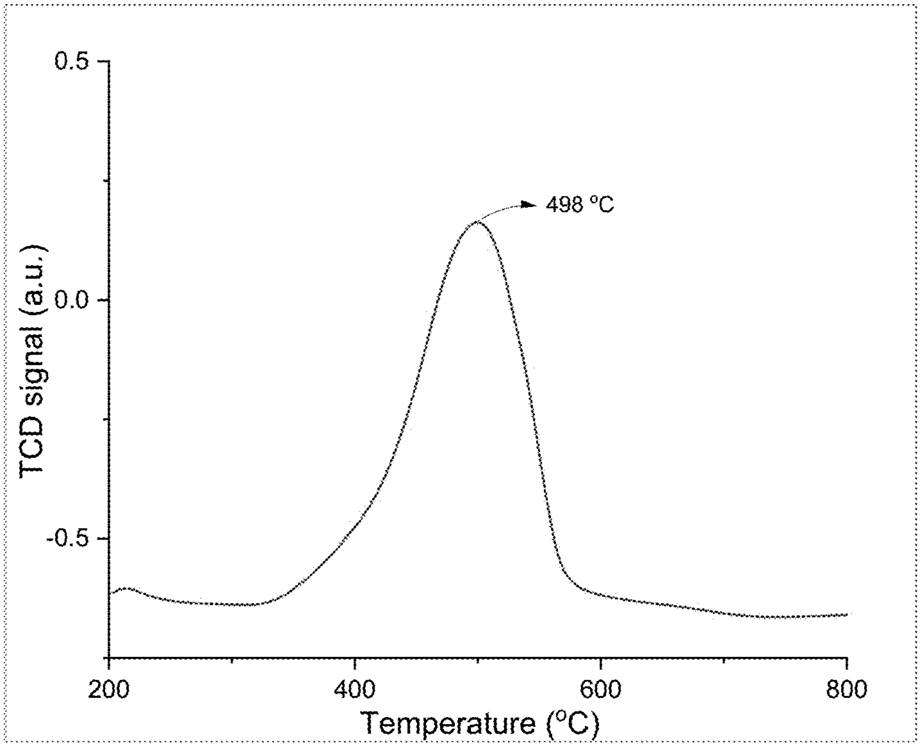
FIG. 4 shows the temperature programmed reduction (TPR) profile of the fresh catalyst sample prepared in the examples.
Figure 5:
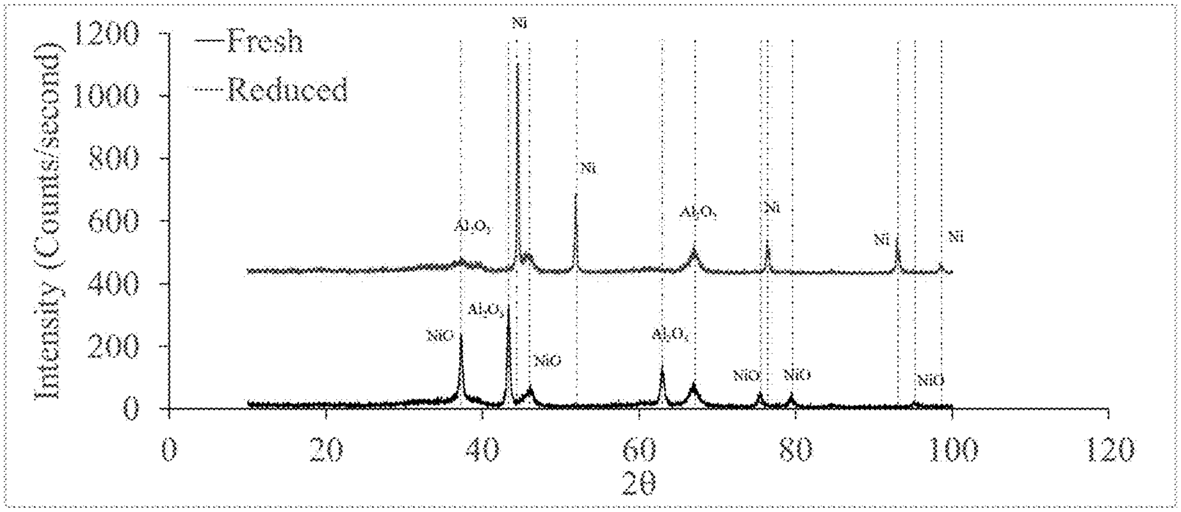
FIG. 5 shows the X-ray diffractometer (XRD) profile of the fresh and the reduced catalyst samples in the examples.
Figure 6:
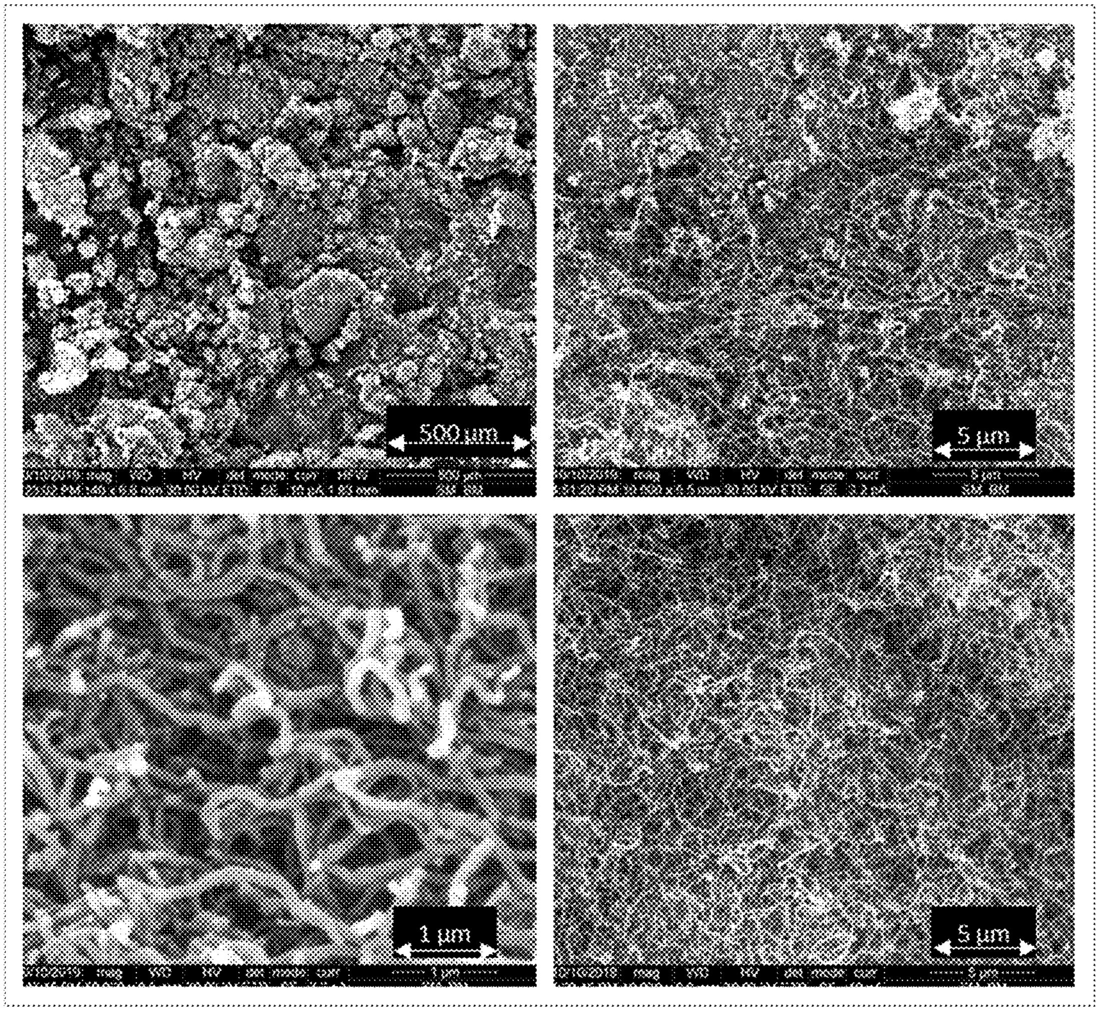
FIG. 6 are scanning electron microscope (SEM) images of the spent CARGEN catalyst in the Examples.
Figure 7:
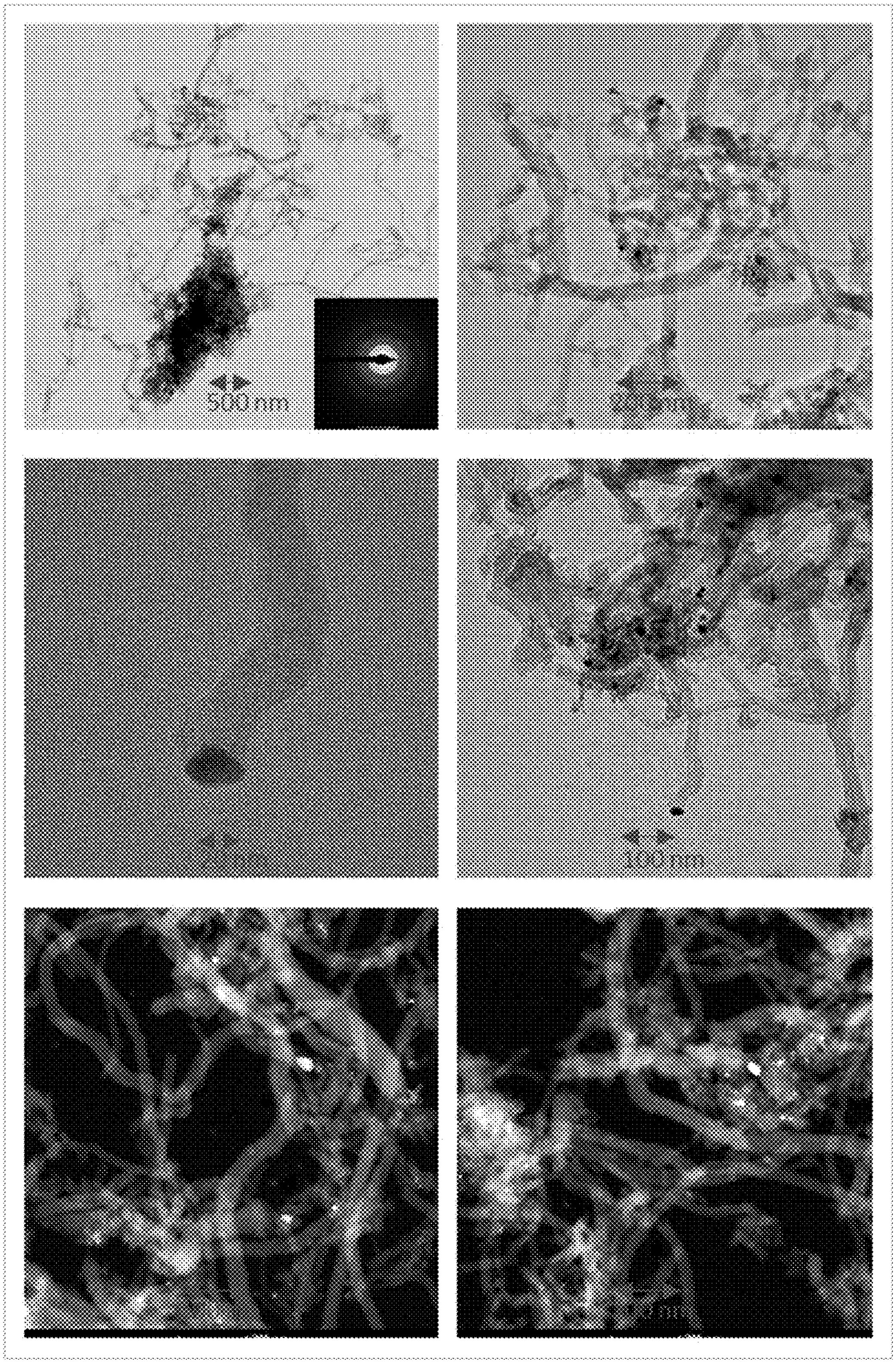
FIG. 7 are transmission electron microscope (TEM) images of the CARGEN catalyst in the examples.

| Quantity | Value |
|---|---|
| Single point surface area at p/p° = 0.30117 | 101.6899 $m^2/g$ |
| BET surface area | 103.9172 $m^2/g$ |
| BJH adsorption cumulative surface area of pores | 108.369 $m^2/g$ |
| BJH desorption cumulative surface area of pores | 128.757 $m^2/g$ |
| BJH Adsorption cumulative volume of pores between 5.000 Å and 1500.000 Å radius | 0.513009 $cm^3/g$ |
| BJH Desorption cumulative volume of pores between 5.000 Å and 1500.000 Å radius | 0.544415 $cm^3/g$ |
| BJH Adsorption average pore radius (2V/A) | 94.931 Å |
| BJH Desorption average pore radius (2V/A) | 84.565 Å |

ii) Fresh catalyst chemisorption: To find the most suitable reduction temperature conditions for the fresh as prepared catalyst, a temperature programmed reduction (TPR) experiment was conducted in the standard Autochem-II Micromeritics chemisorption equipment. The TPR plot in terms of thermal conductivity change signal is presented in FIG. 4. It can be observed that a strong TCD peak at a temperature of 498 °C is formed, indicating that the material is reducible beyond the temperature of 498 °C. The reducibility of the catalyst was calculated using the hydrogen consumption in the $H_2$-TPR experiment. The actual $H_2$ uptake was found to be 2287 μmoles/g of the catalyst at STP. As per the theoretical calculations, the $H_2$ uptake of the catalyst was found to be 3412 μmoles/g of the catalyst at STP. Therefore, the degree of reduction of the catalyst is 67%. It is also worth noting that Ni supported on a γ-$Al_2O_3$ exhibits two distinct reduction temperature between 350-900 °C as reported in many literatures[14, 18]. This is due to the fact that the strong metal support interaction increases the reduction temperature of bulk $Ni_2O_3$ and also the formation of a difficultly reducible NiO due to strong interaction with support. In the present catalyst, only one reduction peak of the Ni around 498 °C is observed which indicates the formation of weak support-metal-interaction (SMI) which is intended for CNT tip growth mechanism. The TPR results further indicate that the catalyst thus forms an egg-shell type of structure[14].

iii) XRD study: the XRD analysis of the fresh and the reduced sample was done using the Rigaku Ultima IV diffractometer with Cu (Kα) radiation (40 kV/40 mA). Both the samples were loaded separately, and recording was done in the 2θ range of 20-110°, in steps of 0.02° or 2 s intervals. FIG. 5 presents stacked XRD plots of both, fresh and the reduced samples. It can be seen clearly that the all the peaks in the fresh sample are for NiO and $Al_2O_3$ catalyst, while for the reduced sample, most of them have been converted to Ni as noted by the peak shifts. The crystallite size of the fresh and reduced catalyst samples at Ni (012) and Ni (111) plane were calculated using Scherrer equation. Mild (1.5×) sintering of the $Ni^0$ particles upon reduction with $H_2$ were observed as the crystallite size of the reduced sampled increased to 35 nm from 21.4 nm of the fresh sample. The sintering due to coalescence is an established phenomenon by which $Ni^0$ crystallite migrate at the support surface due to higher temperatures reduction and forms larger size crystallite. Coalescence of $Ni^0$ is an exothermic reaction which also contributes to the sintering of the crystallites.

iv) Microscopy assessments: in order to validate the formation of carbon, and in particular MWCNT, the spent catalyst from TGA analysis was analyzed under SEM and TEM. FIGS. 6 and 7 present some of the selected images from SEM and TEM microscopy study respectively. Both SEM and TEM microscopy results demonstrate the formation of MWCNTs with diameters in the range of up to 100 nm, and length in micrometer scale.

In summary, CARGEN reaction catalyst is presented with its preparation procedure. The following is disclosed in this invention:

A nickel-based catalyst that will be used in the CARGEN reactor.

Nickel based catalyst may be supported or un-supported catalyst.

The support material may comprise of alumina, titania, silica, zeolites, carbon or any other suitable support material that may be useful for CARGEN reaction.

The Nickel based catalyst will comprise of at least 1 wt % of Nickel to 100 wt % nickel.

The support material may be activated carbon, carbon nanotube or carbon nanofibers that may be separately produced from CARGEN process itself.

The carbon support material may be procured commercially but with a purity of at least 90%.

A ball mill apparatus may be used to mix the catalyst with support.

The ball mill apparatus also increases the surface area of the catalyst while reducing its particle size.

The ball mill apparatus may be laboratory size equipment or bench scale or pilot scale or industrial scale. All the scales provide similar quality of the catalyst material.

The catalyst that is produced from the ball mill apparatus stated above may be produced at lab scale, bench scale and industrial scale.

All the features mentioned above are also applicable in making other catalysts for CARGEN using group VIII metals like Fe, Ni or Co and their combinations thereof.

The catalyst materials stated above may be prepared using other supported materials that include but are not limited to $SiO_2$, $TiO_2$, $Al_2O_3$, MgO, $ZrO_2$, $CeO_2$, zeolites, metal organic frameworks (MOFs), inorganic clays, carbonates, carbon nanotubes etc.

The catalyst material for CARGEN as described above may form egg-shell type of structure resembling weak SMI as may be required for MWCNT growth. However, the catalyst material may not be particularly limited to egg-shell type of structure.

The diameter of MWCNTs from the catalyst material above could be in the range up to 100 nm. However, some of the MWCNTs may also form above 100 nm size.

As used herein and in the appended claims, the singular form of a word includes the plural, unless the context clearly dictates otherwise. Thus, the references "a," "an" and "the" are generally inclusive of the plurals of the respective terms. For example, reference to "an ingredient" or "a method" includes a plurality of such "ingredients" or "methods." The term "and/or" used in the context of "X and/or Y" should be interpreted as "X," or "Y," or "X and Y."

Similarly, the words "comprise," "comprises," and "comprising" are to be interpreted inclusively rather than exclusively. Likewise, the terms "include," "including" and "or" should all be construed to be inclusive, unless such a construction is clearly prohibited from the context. However, the embodiments provided by the present disclosure may lack any element that is not specifically disclosed herein. Thus, a disclosure of an embodiment defined using the term "comprising" is also a disclosure of embodiments "consisting essentially of" and "consisting of" the disclosed components. Where used herein, the term "example," particularly when followed by a listing of terms, is merely exemplary and illustrative, and should not be deemed to be exclusive or comprehensive. Any embodiment disclosed herein can be combined with any other embodiment disclosed herein unless explicitly indicated otherwise.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

CITED REFERENCE

1. Elbashir N O, Challiwala M S, Sengupta D, El-Halwagi M M. System and method for carbon and syngas production. Property WI, Organization, eds. 2018.
2. Pakhare D, Spivey J. A review of dry ($CO_2$) reforming of methane over noble metal catalysts. *Chem Soc Rev.* 2014; 43(22):7813-7837. doi:10.1039/c3cs60395d
3. Chatla A, Ghouri M M, Elbashir N O. Highly stable Copper-Nickel alloyed catalyst for $CO_2$ reforming of Methane: Theory guided experimental validation catalyst design. 2019.
4. Tavares M T, Alstrup I, Bernardo C A, Rostrup-Nielsen J R. Carbon Formation and CO Methanation on Silica-Supported Nickel and Nickel-Copper Catalysts in CO+$H_2$ Mixtures. *J Catal.* 1996; 158(2):402-410.
5. Snoeck J-W, Froment G F, Fowles M. Kinetic study of the carbon filament formation by methane cracking on a nickel catalyst. *J Catal.* 1997; 169(1):250-262.
6. Gili A, Schlicker L, Bekheet M F, et al. Surface carbon as a reactive intermediate in dry reforming of methane to syngas on a 5% Ni/MnO catalyst. *ACS Catal.* 2018; 8(9):8739-8750.
7. Challiwala M, Afzal S, Choudhury H A, Sengupta D, El-halwagi M, Elbashir N O. Alternative pathways for $CO_2$ utilization for enhanced methane dry reforming technology. In: *Advances in Carbon Management Technologies.;* 2019.
8. Amelinckx S, Zhang X B, Bernaerts D, Zhang X F, Ivanov V, Nagy J B. A formation mechanism for catalytically grown helix-shaped graphite nanotubes. *Science* (80-). 1994; 265(5172):635-639.
9. Dupuis A-C. The catalyst in the CCVD of carbon nanotubes—a review. *Prog Mater Sci.* 2005; 50(8): 929-961.
10. Yeoh W-M, Lee K-Y, Chai S-P, Lee K-T, Mohamed A R. Effective synthesis of carbon nanotubes via catalytic decomposition of methane: Influence of calcination temperature on metal-support interaction of Co—Mo/MgO catalyst. *J Phys Chem Solids.* 2013; 74(11):1553-1559.
11. Cheung C L, Kurtz A, Park H, Lieber C M. Diameter-controlled synthesis of carbon nanotubes. *J Phys Chem B.* 2002; 106(10):2429-2433.
12. Kumar M, Ando Y. Controlling the diameter distribution of carbon nanotubes grown from camphor on a zeolite support. *Carbon N.Y.* 2005; 43(3):533-540.
13. Huh Y, Green M L H, Kim Y H, Lee J Y, Lee C J. Control of carbon nanotube growth using cobalt nanoparticles as catalyst. *Appl Surf Sci.* 2005; 249(1-4): 145-150.
14. Lu M, Fatah N, Khodakov A Y. Solvent-free synthesis of alumina supported cobalt catalysts for Fischer-Tropsch synthesis. *J energy Chem.* 2016; 25(6):1001-1007.
15. Bahruji H, Esquius J R, Bowker M, Hutchings G, Armstrong R D, Jones W. Solvent Free Synthesis of PdZn/TiO 2 Catalysts for the Hydrogenation of CO 2 to Methanol. *Top Catal.* 2018; 61(3-4):144-153.
16. Ahmed W, El-Din M R N, Aboul-Enein A A, Awadallah A E. Effect of textural properties of alumina support on the catalytic performance of Ni/$Al_2O_3$ catalysts for hydrogen production via methane decomposition. *J Nat Gas Sci Eng.* 2015; 25:359-366.
17. Bayat N, Rezaei M, Meshkani F. Methane decomposition over Ni—Fe/$Al_2O_3$ catalysts for production of COx-free hydrogen and carbon nanofiber. *Int J Hydrogen Energy.* 2016; 41(3): 1574-1584.
18. Zhao A, Ying W, Zhang H, Ma H, Fang D. Ni—Al 2O 3 catalysts prepared by solution combustion method for syngas methanation. *Catal Commun.* 2012; 17:34-38. doi:10.1016/j.catcom.2011.10.010

The invention claimed is:

1. A method of preparing a catalyst for a Carbon Generator Reactor (CARGEN) process, the method comprising:

ball milling a catalyst mixture in a ball milling apparatus, wherein the catalyst mixture comprises a precursor material and a support material, wherein the precursor material comprises a nickel oxide material and the support material comprises $Al_2O_3$, wherein the ball milling apparatus comprises stainless steel balls of about 5 mm in diameter and 0.5 g in mass, wherein the nickel oxide material and the $Al_2O_3$ are milled at a rotation rate of 50 Hz at 250 rpm, wherein the ratio of the number of stainless steels balls in the ball milling apparatus to the weight of the catalyst mixture in grams is 10:1, and wherein a milling time is 1 hour;

calcining the catalyst mixture at a temperature of 400 °C for 4 hours; and sieving the catalyst mixture at a 300 μm size, wherein the catalyst is utilized in the CARGEN process to produce a carbon material including multi-walled carbon nanotubes (MWCNT).

2. The method of claim 1, wherein the calcination includes a muffle furnace set a ramping rate of 5 °C per minute to reach the temperature of 400 °C, and wherein the muffle furnace is configured to slowly ramp down to room temperature after remaining at the temperature of 400 °C for 4 hours.

3. The method of claim 1, wherein an amount of the nickel oxide material is about 20 wt % of a total amount of the precursor material and the support material.

4. The method of claim 1, wherein the MWCNT has a diameter of up to 100 nm.

5. The method of claim 1, wherein the catalyst has a total surface area of greater than 10 $m^2/g$.

6. The method of claim 1, wherein the catalyst has a pore volume of at least 0.1 $cm^3/g$.

* * * * *